(12) United States Patent
Chandra et al.

(10) Patent No.: US 7,212,421 B2
(45) Date of Patent: May 1, 2007

(54) COMBINATION FEEDBACK CONTROLLER AND POWER REGULATOR USING SAME

(75) Inventors: Anuag Chandra, Los Alamitos, CA (US); Suresh Gupta, Los Alamitos, CA (US)

(73) Assignee: Perfect Electric Power, Inc., Del Mar, CA (US)

( * ) Notice: Subject to any disclaimer, the term of this patent is extended or adjusted under 35 U.S.C. 154(b) by 225 days.

(21) Appl. No.: 11/080,584

(22) Filed: Mar. 15, 2005

(65) Prior Publication Data
US 2006/0212737 A1   Sep. 21, 2006

(51) Int. Cl.
*H02M 5/04* (2006.01)
*H02M 5/22* (2006.01)

(52) U.S. Cl. .................. 363/164; 363/41; 363/163; 307/45; 307/64

(58) Field of Classification Search ............ 307/44–46, 307/64, 66, 105; 323/205, 207; 363/39–41, 363/98, 157, 159, 163–165
See application file for complete search history.

(56) References Cited

U.S. PATENT DOCUMENTS

| | | | |
|---|---|---|---|
| 4,564,767 A | | 1/1986 | Charych |
| 5,047,910 A | | 9/1991 | Levran et al. |
| 5,563,778 A | | 10/1996 | Oh |
| 5,654,591 A | | 8/1997 | Mabboux et al. |
| 5,656,923 A | * | 8/1997 | Schultz et al. .............. 323/207 |
| 6,218,744 B1 | | 4/2001 | Zahrte, Sr. et al. |
| 6,472,775 B1 | * | 10/2002 | Huang et al. ................ 307/105 |
| 6,768,223 B2 | | 7/2004 | Powell et al. |
| 6,917,124 B2 | * | 7/2005 | Shetler et al. ................. 307/66 |
| 6,940,187 B2 | * | 9/2005 | Escobar et al. ............... 307/64 |
| 2003/0042877 A1 | | 3/2003 | Tasi et al. |
| 2003/0048006 A1 | | 3/2003 | Shelter, Jr. et al. |
| 2003/0062774 A1 | | 4/2003 | Escobar et al. |
| 2004/0084965 A1 | | 5/2004 | Welches et al. |
| 2004/0136208 A1 | | 7/2004 | Agarwal et al. |

* cited by examiner

*Primary Examiner*—Gary L Laxton
(74) *Attorney, Agent, or Firm*—Fulwider Patton LLP (57) ABSTRACT

A combination controller incorporates features of a classic controller and a state space controller to function as a hybrid controller unit. The PID portion of the classic controller regulates the steady state error and is separated from the pulse width modulated constant frequency signal generator that also comprises part of the classic controller. The PID portion is coupled with a state space controller such that the output of the PID controller, i.e., the steady state error correction, is input to the state space controller. The state space controller further receives as input variables a reference sinusoidal signal, the load current, the current across a pre-load filter capacitor, and the output voltage. From these inputs, the state space controller employs principles of differential calculus to generate a transient error correction that is fed to a PWM signal generator for generating a sinusoidal output voltage signal with both steady state and transient error correction. The sinusoidal output voltage signal is directed to a power amplifier and filtered for delivery to a connected load. The combination controller is thusly incorporated into an electrical feedback system such as a frequency converter, a power conditioner, and an uninterruptible power supply (UPS).

23 Claims, 10 Drawing Sheets

MULTI-PLATFORM UPS-SERIES REGULATOR

COMBINATION FEEDBACK CONTROLLER AND POWER REGULATOR USING SAME

FIELD OF THE INVENTION

The present invention relates to a feedback controller for use in electrical power regulators, and more particularly to a combination controller for rapid response to balanced and unbalanced load conditions with minimal steady state error and low total harmonic distortion.

BACKGROUND OF THE INVENTION

The electrical power that runs the equipment used in domestic and business operations is obtained from a complex distribution system that communicates power generated at large production plants across a grid to local generating stations and substations. The generating stations and substations are interconnected with the local businesses and households via a network of utility lines that communicate the power. Distributed electric power generation that convert power from photovoltaic devices, micro-turbines, or fuel cells can function in conjunction with the grid to supplement to power supply from the main plant. Thus, power may be generated from different sources and then combined to feed the power network. Loads that are connected to the grid take the generated power and convert it to a usable form or for supplementing the grid. The control, monitoring, and integration of various electrical power supplies is a complex operation that can sometimes lead to discontinuities and interruptions in the smooth distribution of electrical power to the equipment reliant on this power supply.

The number and types of independent energy sources is growing rapidly, and can include photovoltaic devices, wind, hydro, fuel cells, storage systems such as battery, super-conducting, flywheel and capacitor types, and mechanical means including conventional and variable speed diesel or IC engines, Stirling engines, gas turbines, and micro-turbines. Each of these independent energy sources needs some type of power converter that feeds energy to the grid or used to directly power the various loads. There must also be some means to provide protection when the grid becomes unstable or there is a fault in the system.

A problem with present electrical power distribution systems at the consumer end of the chain is the application the integrated power supply to a unbalanced or non-linear load condition, and the unwanted harmonics that can be generated by non-linear loading conditions. In distributed power applications, high harmonic content or unbalanced loads may lead to inefficiency, resonances, equipment malfunction or damage, and other unanticipated distribution system behavior. This high harmonic feedback can also result in damage to equipment and possibly personal injury. Power conditioners and harmonic "eaters" are devices that can be used to protect equipment from unsteady power supplies.

Power converters, including inverters coupled to a DC source, are used as back-up power supplies to accommodate the lapses or gaps in the power supplied by the distribution system, and are particularly applicable when power is integrated with newer energy generating devices such as photovoltaic devices, micro-turbines, variable speed internal combustion (IC) engines, fuel cells, and superconducting storage. These devices generate AC or DC electricity that needs to be converted to a conditioned AC for feeding the connected loads.

Uninterruptible power supplies (UPS) systems are devices that are commonly used to stabilize and maintain a back-up constant power supply for use in the event of an interruption in the main power distribution system. UPSs are used to compensate for voltage sags in the line voltage and provide instantaneous back-up voltage to equipment when the primary voltage power is interrupted. This can be critical to certain devices that cannot tolerate power interruptions, such as computers, medical devices, and safety equipment. The quality of the power supplied by a UPS system is affected by various factors, including the quality of the output voltage regulation, the total harmonic distortion introduced by the UPS into the power distribution system, the output impedance of the UPS, the response of the UPS to transient events in the line voltage, and the response of the UPS to non-linear or distorted load requirements. Feedback control systems that control the UPS voltage, frequency and amplitude are pivotal to enhance the quality of the UPS output. An example of an arrangement and operation of a UPS and its controls is described in U.S. Pat. No. 6,768,223 to Powell et al., issued Jul. 27, 2004, the contents of which are fully incorporated herein by reference.

Prior art controllers for UPS systems traditionally use a single voltage control loop using proportional-integral (PI) control laws or proportional-integral-derivative (PID) control laws. These controllers may include a pulse width modulated frequency generator to smooth the frequency output to match the requirements of the particular load served. U.S. Pat. No. 5,654,591 to Mabboux et al., issued Aug. 5, 1997, the contents of which are fully incorporated herein by reference, illustrates the use of both of these types of controllers in a UPS system. PI controllers and PID controllers, collectively referred to herein as "classic" controllers, offer the benefits of minimal steady state error and are extremely stable, but classic controllers are ill-equipped to handle harmonic distortion at the output voltage which are exacerbated by non-linear loads. The transient response of a classic controller can also be problematic, with response time on the order of 5–50 milliseconds. Also, there is a typically drop in the voltage of a system using a classic controller when a full load is applied, and this voltage drop is proportional to the impedance of the system.

Another, less frequently used type of controller is the state space controller which is based on the set of "state" variables solved by differential calculus. An example of a state space controller is described in U.S. Pat. No. 5,047,910 to Levran et al., issued Sep. 10, 1991, the contents of which are fully incorporated herein by reference. State space controllers exhibit very good transient response time (less than 1 ms) and very low harmonic distortion in the range of one percent or less. However, several drawbacks exist in the use of state space controllers that largely exclude their use in most applications, including a relatively large steady-state error associated with the use of state space controllers that may be as high as 10% of the full load, an instability that can result in a modulation of the output voltage, and a frequency inconsistency with pulse width modulation that varies with conditions such as load, filter components, and DC bus voltage.

The art is in need of a controller for a feedback system that can eliminate or substantially reduce the steady state error while simultaneously addressing the transient response and harmonic output characteristic of non-linear loads.

SUMMARY OF THE INVENTION

The present invention incorporates the benefits of both the classic controller and the state space controller using a combination controller that is stable and has minimal steady state error, and has a rapid transient response with low harmonic distortion resulting in a constant frequency output, even under non-linear loading. The combination controller divides the classic controller into two parts. The PID portion controlling the steady state error is separated from the pulse width modulated constant frequency signal generator. The PID portion is incorporated together in advance of a state space controller such that the output of the PID controller, i.e., the steady state error correction, is input to the state space controller. The state space controller further receives as input signals a reference sinusoidal signal, the load current, the current across a pre-load filter capacitor, and the output voltage. From these inputs, the state space controller generates a transient error correction that is fed to the PWM portion of the classic controller for generating a sinusoidal output with both steady state and transient error correction. The sinusoidal output is directed to a power amplifier and filtered for delivery to the load.

The foregoing combination controller is well suited to clean utility current harmonics and output voltage harmonics as well as provide a super fast voltage correction on transient loads. The controller can be used as part of a frequency converter, a power conditioner, and an uninterruptible power supply (UPS) to name a few applications. Other features and advantages of the invention will become apparent from the following detailed description, taken in conjunction with the accompanying drawings which illustrate, by way of example, the features of the invention.

DETAILED DESCRIPTION OF THE INVENTION

Figure 1:
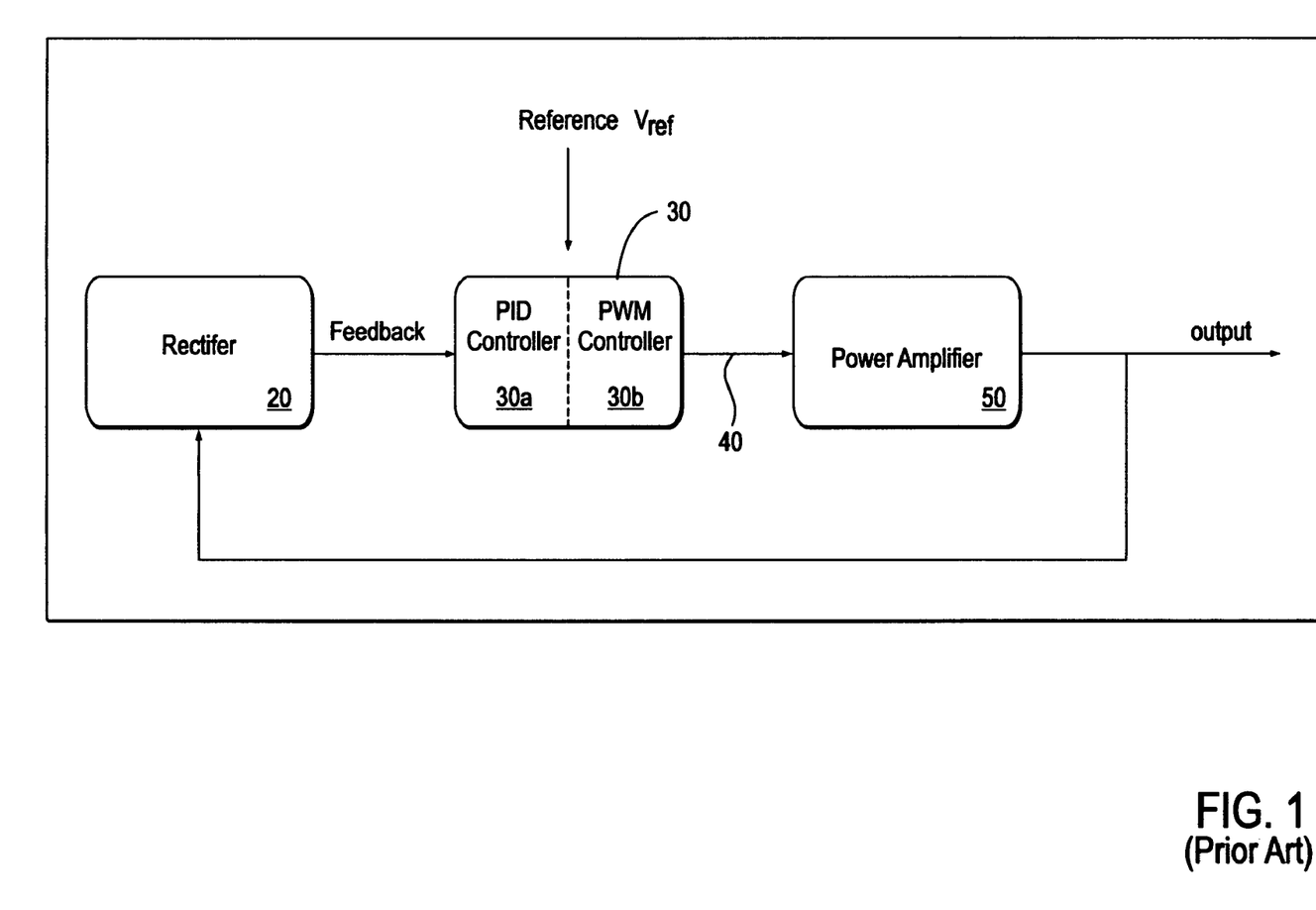
FIG. 1 is a block diagram of a classic or PID controller.

FIG. 1 illustrates a typical single loop voltage feedback system employing what is herein called a classic controller selected from the group of proportional-integral (PI), proportional-derivative (PD), and proportional-integral-derivative (PID) controllers. A rectifier 20 receives a sinusoidal output voltage and converts the AC voltage to an average DC value. The average value of the DC voltage feedback derived from the output voltage is then received by a classic controller 30, that compares the DC average value with a reference voltage $V_{REF}$. A steady state error signal associated with the average value of the output voltage is generated by the PID component 30a controller, which then combines the steady state error with a pulse width modulated signal generated by the PWM signal generator 30b portion of the classic controller 30 to yield a modified or conditioned signal 40. The conditioned signal is then supplied to a power amplifier 50 for enhancement of the conditioned signal, and the signal is then typically filtered using a inductor-capacitor filter (not shown) prior to making the output voltage available to an attached load.

In a close loop system such as that shown in FIG. 1, the error between the output voltage $V_O$ and the pulse width modulated (PWM) signal 40 generated by the PWM component 30b of the controller 30 is the error e. The variable (e) represents the tracking error, the difference between the desired input value and the actual output. The error signal is sent to the PID controller 30a, which computes the derivative and the integral of the error signal. The signal derived by the PID controller is equal to the proportional gain ($K_P$) times the magnitude of the error plus the integral gain ($K_I$) times the integral of the error plus the derivative gain ($K_D$) times the derivative of the error. This can be represented by the following expression.

$$K_P e + K_I \int e\, dt + K_D\, de/dt$$

The signal is sent to the PWM signal generator 30b, and a new output is obtained. The new output is rectified by the rectifier 20 and sent back to the PID controller 30a to find a new error signal, and the process is repeated over and over again. The use of PI and PID controllers are well established in the art of electrical feedback control systems because of their relative stability and because a very low steady state error can be achieved with the classic controller.

Figure 2:
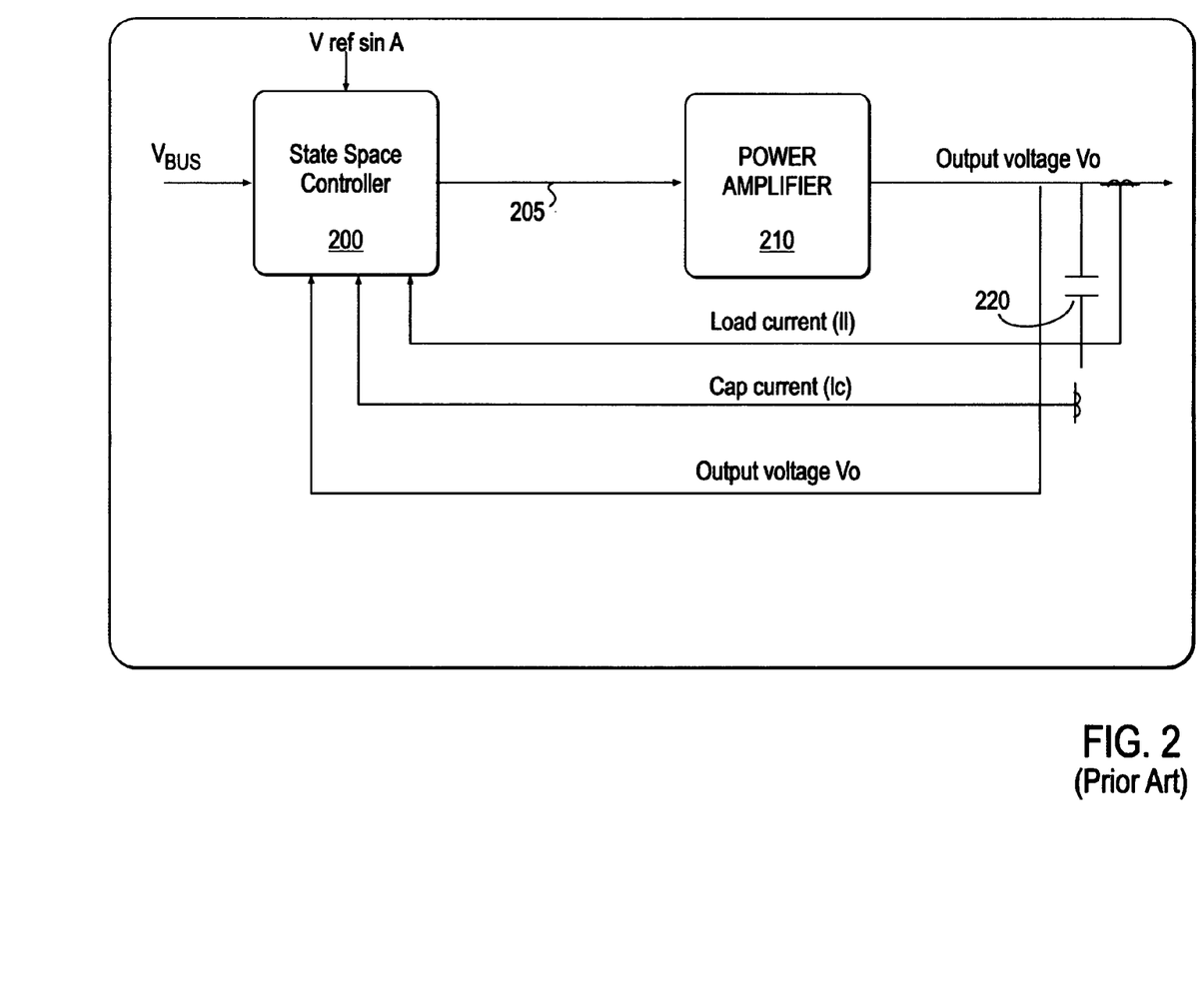
FIG. 2 is a block diagram of a state space controller.

FIG. 2 illustrates a block diagram of a state space feedback controller. There are several different ways to describe a system of linear differential equations. The state-space representation is given by the equations:

$$\frac{d\vec{x}}{dt} = A\vec{x} + Bu$$

$$y = C\vec{x} + Du$$

where x is an n by 1 vector representing the state, u is a scalar representing the input, and y is a scalar representing the output. The Eigenvalues of A give the system poles. The controller design involves solving equations above to meet the control objectives. The details of the schematic configuration and mathematics associated with state space controllers are set forth in U.S. Pat. No. 5,047,910 to Levran et al., incorporated herein by reference, and accordingly its description is omitted herein for brevity.

The input to the state space controller 200 shown in FIG. 2 include a reference sinusoidal voltage signal ($V_{REF\,Sin\,A}$) generated from a controlled source selected to compliment the waveform of the output load requirements. The state space controller 200 also receives the DC bus voltage ($V_{BUS}$) representing an average voltage supplied by the input voltage source, the load current $I_L$ corresponding to the current supplied to the recipient load, the output voltage $V_O$, and the current $I_C$ across a capacitor 220 serving as a filter to the recipient load. As set forth in Levran et al., an electrical circuit is established to solve the state space equations and provide a control signal 205 to the power amplifier 210 for amplification and delivery to the output voltage terminal.

Figure 3:
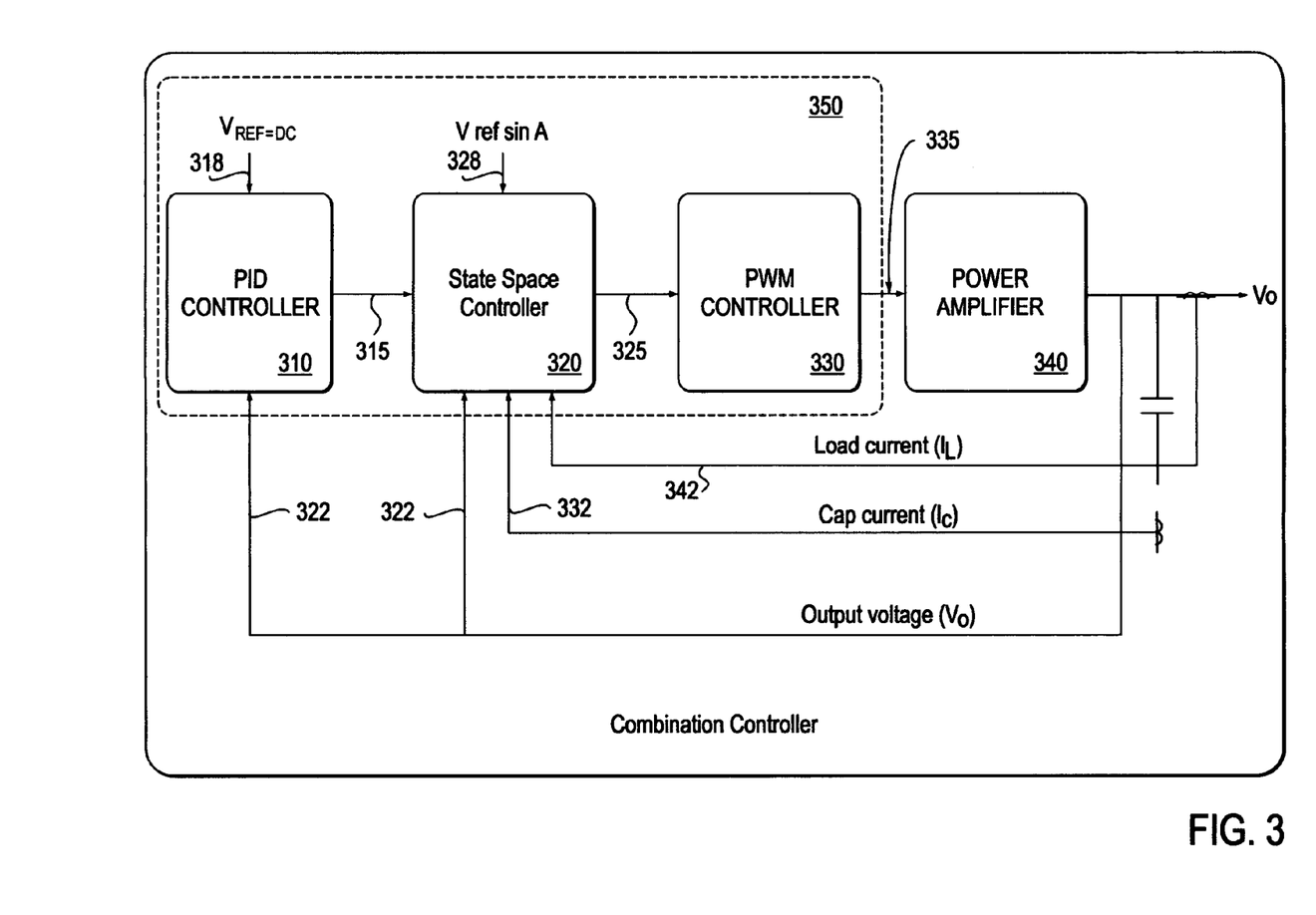
FIG. 3 is a block diagram of a combination controller of the present invention.

FIG. 3 illustrates a combination controller 350 of the present invention. The combination controller combines controllers 310, 320, 330 to function as a single hybrid controller that compensates for steady state error and significantly reduces harmonic disturbance in the system.

The combination controller 350 of FIG. 3 includes is a first controller 310 for regulating a steady state value of an amplified output voltage signal of said combination controller. Using either PI or PID (or other suitable alternative methods), controller 310 receives a reference DC voltage 318 for use as a comparator with the determined average value of the output voltage signal 322 to evaluate a steady state error in the feedback system. The reference DC voltage 318 ($V_{ref}$) can be applied from an isolated source or from the feedback loop itself. A second input of the controller 310 is an amplified output voltage signal 322 of said combination controller ($V_O$), and the controller 310 generates a steady state error correction signal 315 ($E_{SS}$) representing a difference between the average output voltage and an ideal average output voltage, and a signal representing same 315 is directly input to the second, or state space, controller 320.

The state space controller 320 cooperates with said first controller 310 in that it receives the steady state error signal 315 as well as a reference sinusoidal voltage 328 ($V_{ref\,Sin\,A}$). In order to solve the state space equations, the controller 320 also receives as inputs the amplified output voltage signal of said combination controller 322 ($V_O$), a current signal 332 corresponding to a pre-load filter capacitor ($I_C$), and an output current signal 342 ($I_L$) Using the five inputs ($V_{ref\,Sin\,A}$, $E_{SS}$, $I_C$, $V_O$, and $I_L$), the state space controller 320 generates a transient response error signal 325 ($E_T$) that is directly forwarded to a constant frequency pulse width modulated signal generator 330 incorporated in controller 350.

Controller 330 cooperates state space controller 320 by receiving the transient response error signal 325 ($E_T$) and generating a constant frequency pulse width modulated (PWM) sinusoidal voltage signal 335. Because the frequency of the output signal 325 from the state space controller 320 is variable—a disfavored characteristic of the amplified output signal—the PWM signal generator 330 converts the signal 325 to a uniform frequency signal. The signal 335 from the PWM controller 330 is communicated directly to a power amplifier 340 configured to receive said PWM sinusoidal voltage signal 335 and produce the amplified output voltage signal 322 ($V_O$) of said combination controller 350.

The combination controller 350 is a combination of the classical controller 30 and the state space controller 200, arranged in a manner that the two controllers compliment each other and improve the overall performance of the system. Such as controller can be applied to an electrical or mechanical system and the benefits of the combination controller will be realized. The controller 310 controls the steady state error value of the output voltage and keeps the system stable. The state space controller 320 controls the waveform, i.e., the harmonics, and regulates the transient response by comparing the output voltage to the reference sinusoidal signal. Finally, the controller 330 makes the PWM frequency constant and creates a sinusoidal wave form that is applied directly to the power amplifier 340.

Figure 4:
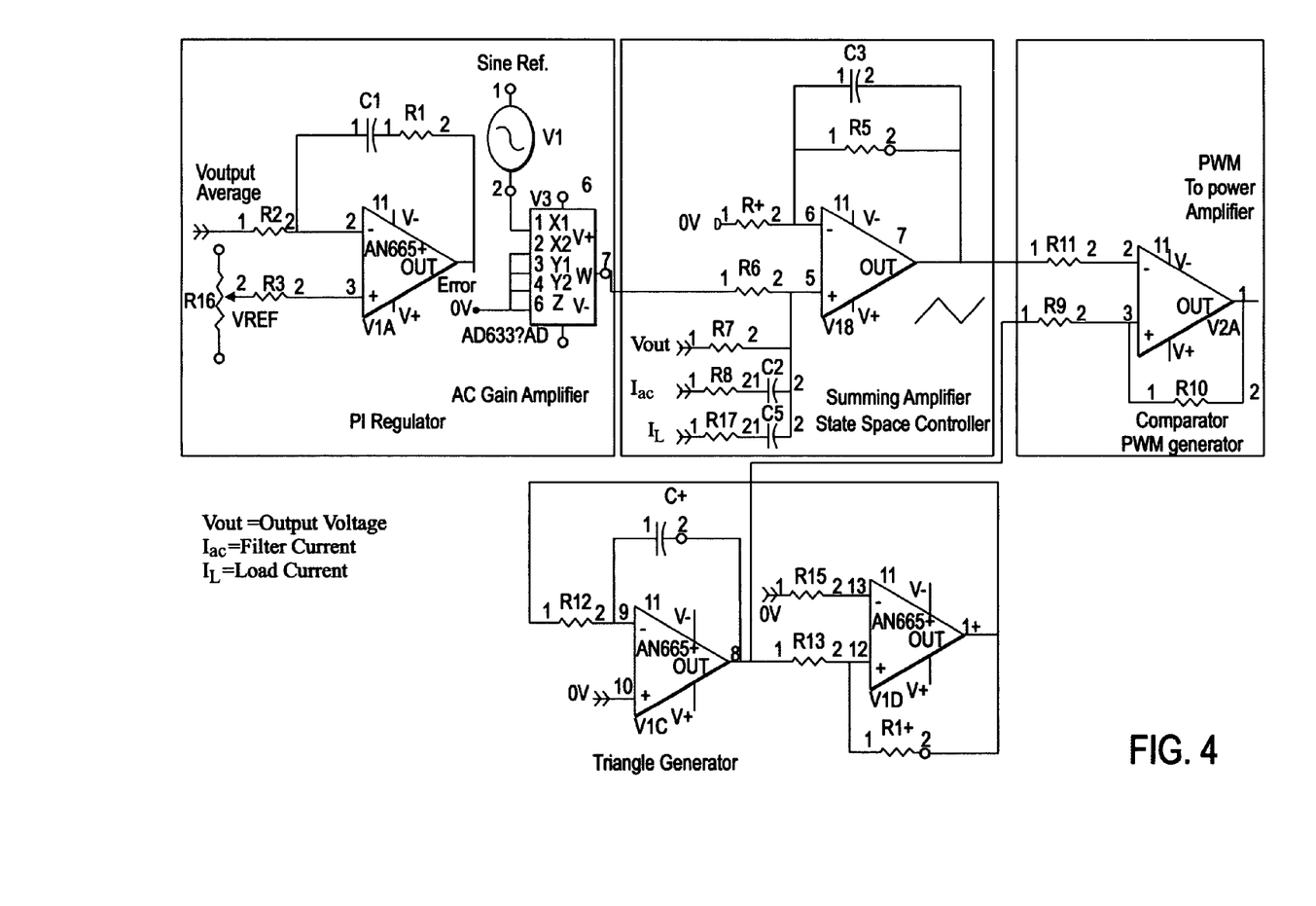
FIG. 4 is a schematic diagram of a controller of the present invention.

FIG. 4 illustrates a schematic diagram of the combination controller 350 shown in FIG. 3. The elements of the combination controller can be mounted on a single board to provide a compact, efficient solution to the feedback control problem. PI regulator 310 receives the average voltage output across resister R2 and a ground or DC reference voltage across resister R3 from DC source VREF having a resistor R16. If a PID controller were substituted for the PI controller, an inductor would be included in the RC circuit. The average output voltage and the reference DC voltage are fed to an amplifier 805, and which outputs a difference signal denoted ERROR. The average output signal is also communicated across an RC circuit using capacitor C1 and resister R1, where it is communicated along with the ERROR signal to an AC gain amplifier 810. The amplifier 810 also is coupled to a sine wave generator 815, and the AC gain amplifier outputs the steady state error correction signal 315 to the state space controller 320.

The state space controller 320 receives the steady state error correction signal 315 from the PI (or PID) controller 310 across resistor R6, and also receives the output voltage signal Vo across resister R7, the load current across resister R17 and capacitor C5, and the current across the filter capacitor across resistor R8 and capacitor C2. These inputs are delivered to a summing amplifier along with the signal OV, a reference sine wave signal passed across resistor R4. The reference signal OV is also routed around the amplifier using a capacitor C3 and resistor R5 in parallel. The output of the amplifier 820 is the transient response error signal 325 that is forwarded to the pulse width modulator controller 330.

Figure 9:
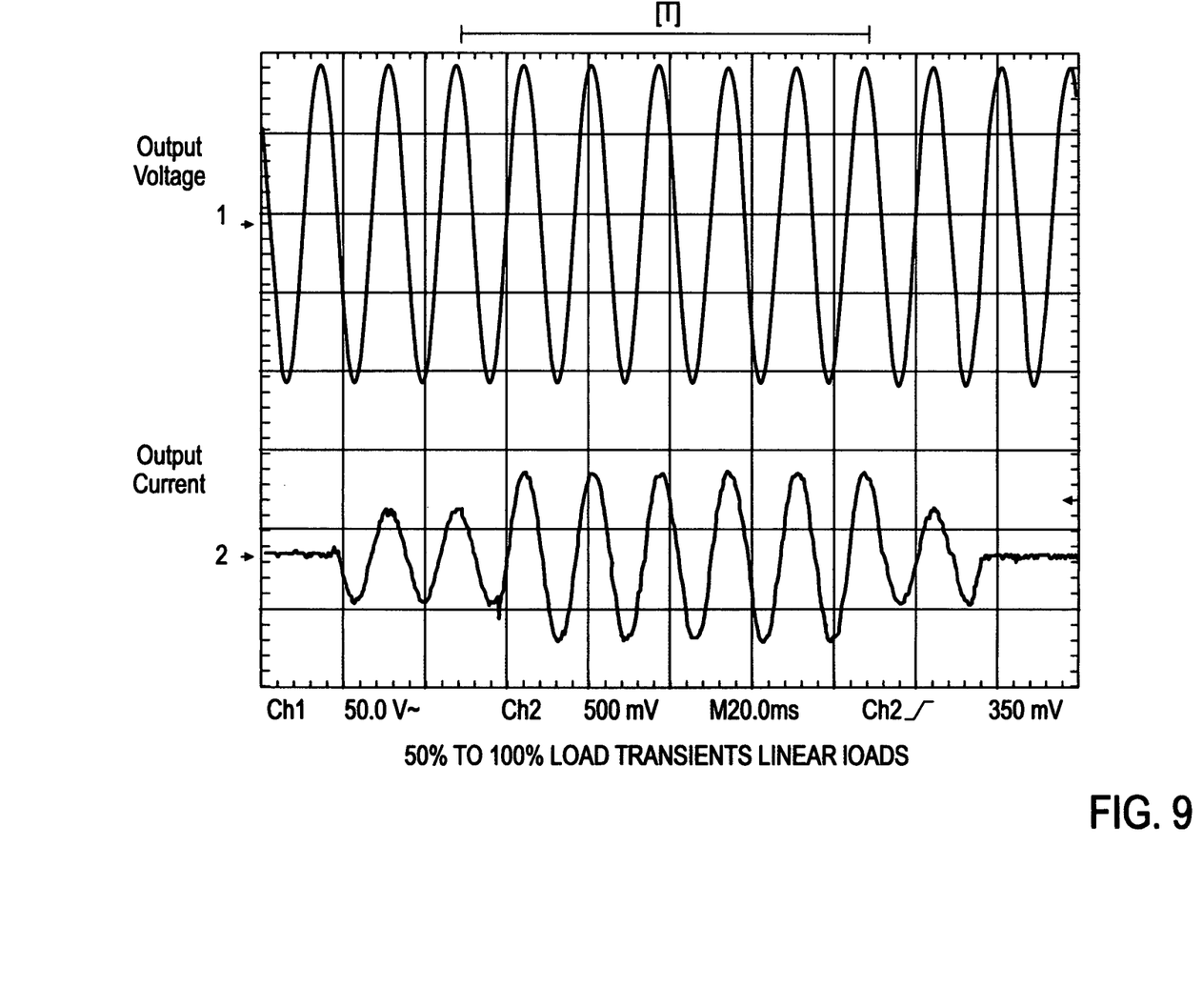
FIG. 9 is a graph of the 50% to 100% load transients for a linear load using the controller of the present invention.
Figure 10:
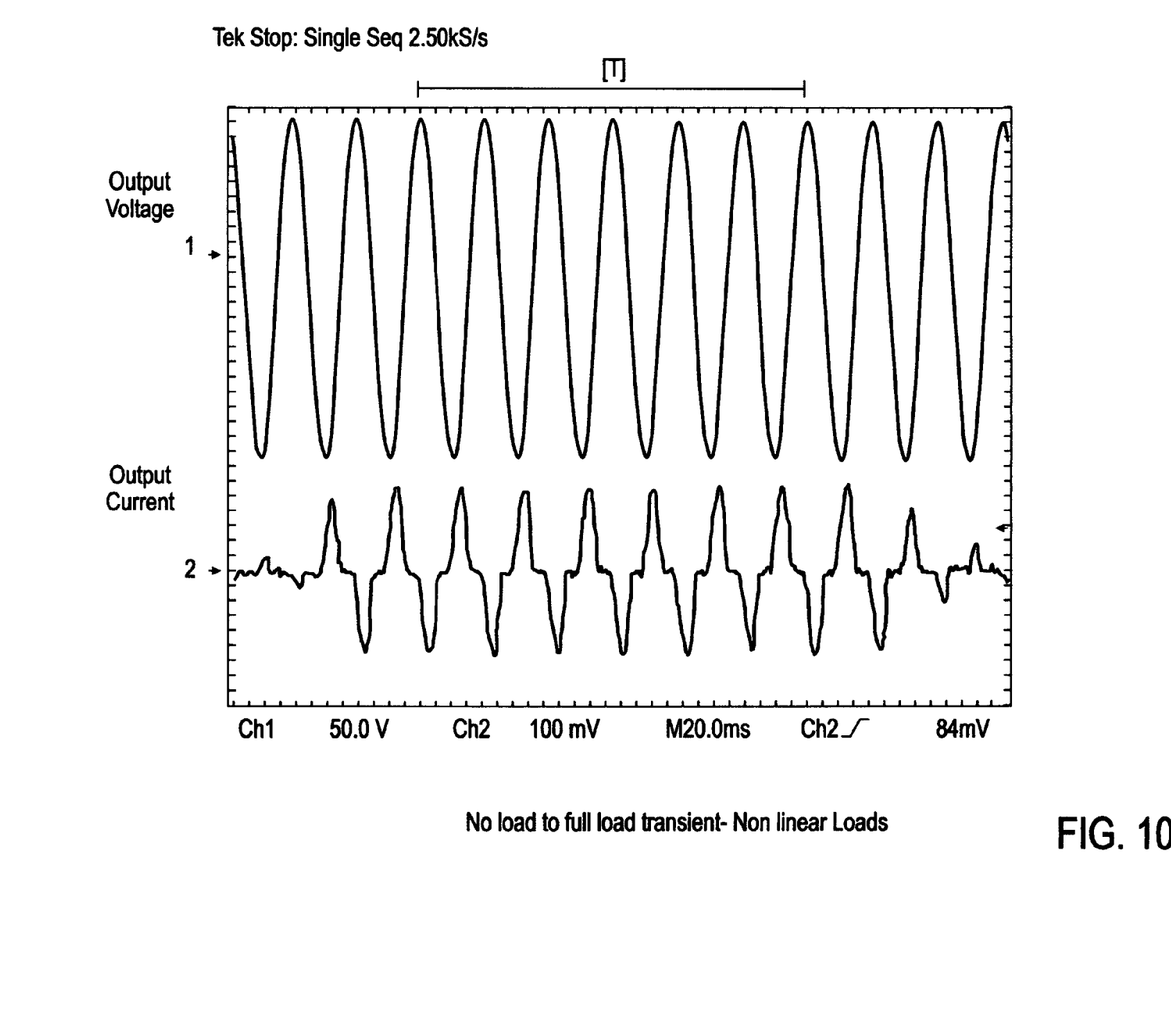
FIG. 10 is a graph of the 0 to 100% load transients for a non linear load using the controller of the present invention.

The pulse width modulator controller 330 compares the amplified output 335 from the product of the state space controller 320 output signal 325 across resistor R11 and the output 845 from the triangle wave generator circuit 850 across resistor R9, and generates a constant frequency pulse width modulated signal 335 that is directed to the power amplifier 340. The signal 335 incorporates the steady state error correction from the PI controller 310 and the transient error correction from the state space controller 320, and the resultant signal 335 is regulated by the triangle wave generator such that the amplified voltage output signal Vo is regular even under transient load conditions. Testing of no load to full load conditions with non-linear loading and half load to full load transients using linear loading shown in FIGS. 9 and 10 demonstrate that the controller of the present invention a constant and uniform output voltage signal under severe transient and non-linear load conditions.

Application No. 1—Frequency Converter

Figure 5:
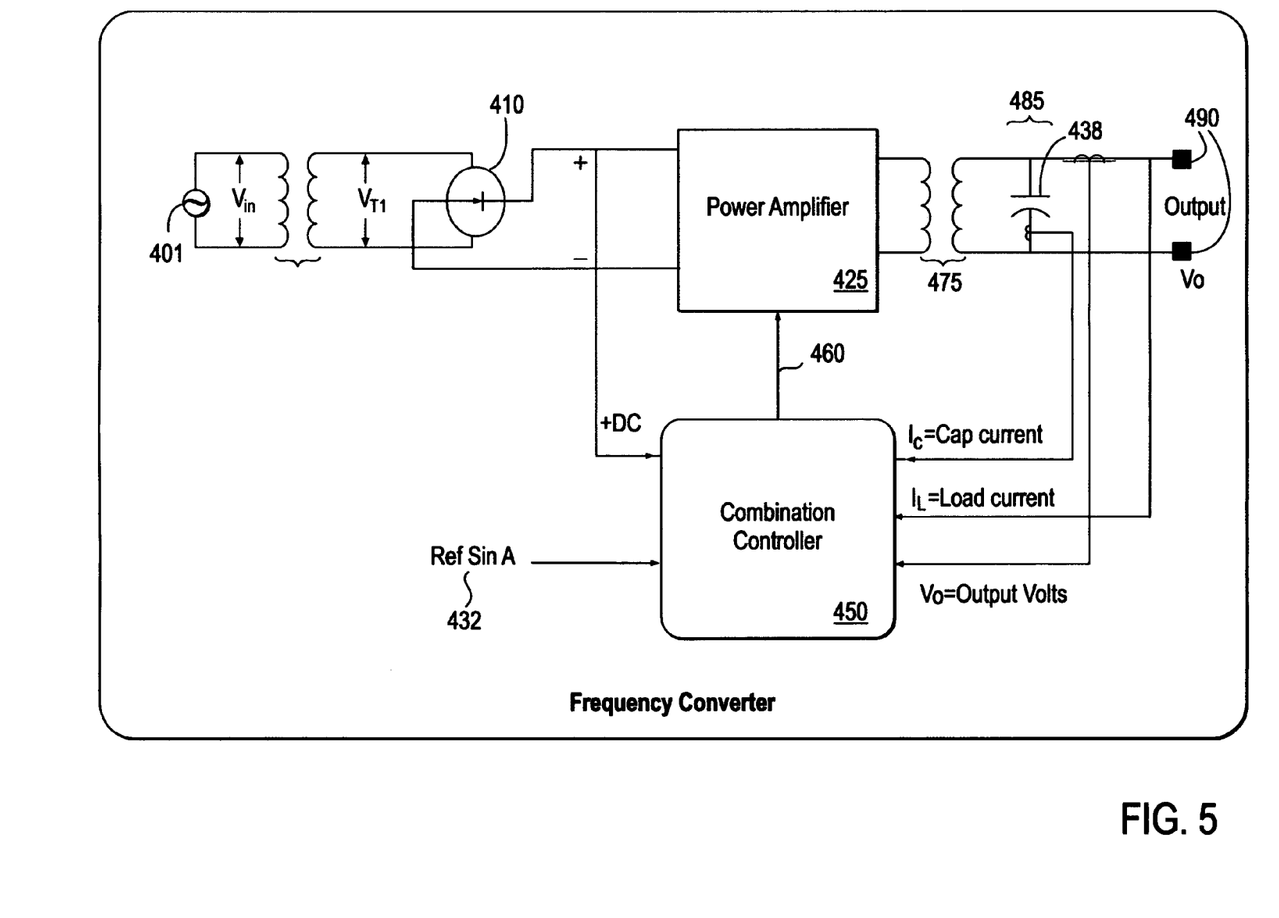
FIG. 5 is a block diagram of a frequency converter using the combination controller of FIG. 3.

There are many applications for the combination controller shown in FIG. 3. A first exemplary application is shown in the frequency converter illustrated using a block diagram in FIG. 5. In FIG. 5, an input AC power source 401 operating at a first frequency and phase, is coupled to a first transformer 405 for stepping up (or down) the input voltage $V_{IN}$. The transformed voltage $V_{T1}$ is then fed to a rectifier 410 that converts the AC power to a DC power. The rails 415a,b leading from the rectifier 410 are connected to terminals of a power amplifier 425. The positive rail 415a leading from the rectifier 410 is also connected to a combination controller 450, which also receives a sinusoidal reference signal 432. The combination controller 450 receives two current signals, the first representing the current delivered to the load ($I_L$) and the second representing the current ($I_C$) across the filter capacitor 438. The controller 450 processes the inputs and generates a new signal 460 having a frequency different from the input frequency of the input power source 405. The new signal is directed to the power amplifier 425 to enhance the signal 460 from the controller 450, and the enhanced signal is fed to a second transformer 475 and a filter 485 (including capacitor 438) before making the new voltage signal with new frequency available to the output terminals 490 connected to the load (not shown).

Application No. 2—Power Conditioner

Figure 6:
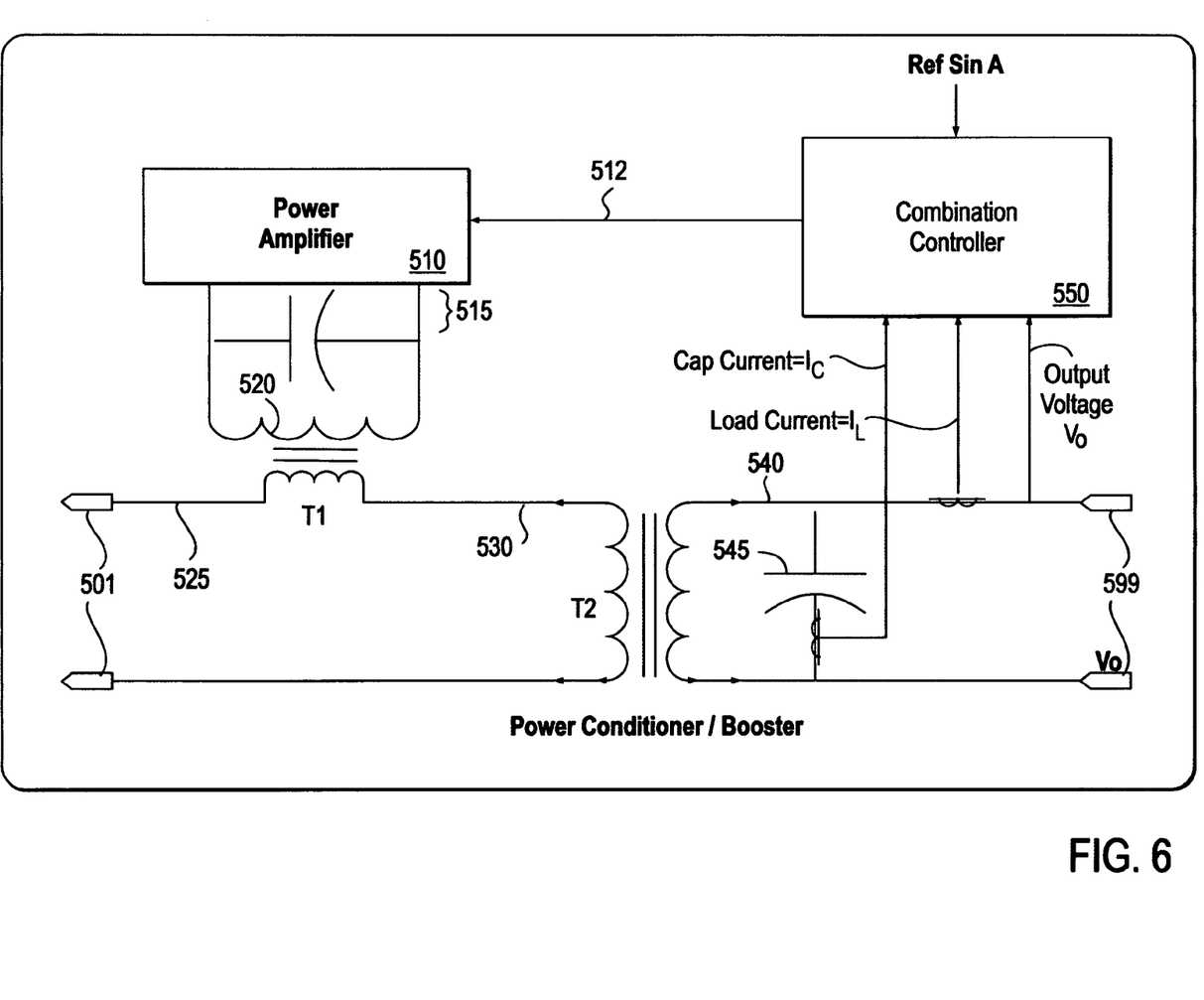
FIG. 6 is a block diagram of a power conditioner using the combination controller of FIG. 3.

A second exemplary application of the combination controller of the present invention is depicted in the schematic for a power conditioner or power booster as illustrated in FIG. 6. The terminals 501 coupled to an input voltage source (not shown) forms a continuous circuit that is coupled to a series transformer T1 and an output transformer T2. The series transformer T1 serves to condition the voltage of the input source using a feedback loop in connection with a combination controller 550 of the present invention. The controller 550 has the construction and operation as described in FIG. 3 and is coupled to the output voltage, load current, pre-load filter capacitor, and a reference sine wave signal generator. The controller 550 sends a constant frequency pulse width modulated signal 512 having steady state and transient error correction to the power amplifier 510 for amplification of the conditioned signal 512. The amplified signal is processed with a filter 515 and directed to the coils 520 of transformer T1, which in turn regulates the input voltage signal 525. The regulated voltage signal 530 is passed through a second transformer T2 used to step up the voltage signal for application to the load. The stepped up voltage signal 540 is filtered using capacitor 545 and connected to output terminals 599 for delivery to a connected load.

Application No. 3—Uninterruptible Power Supply

Figure 7:
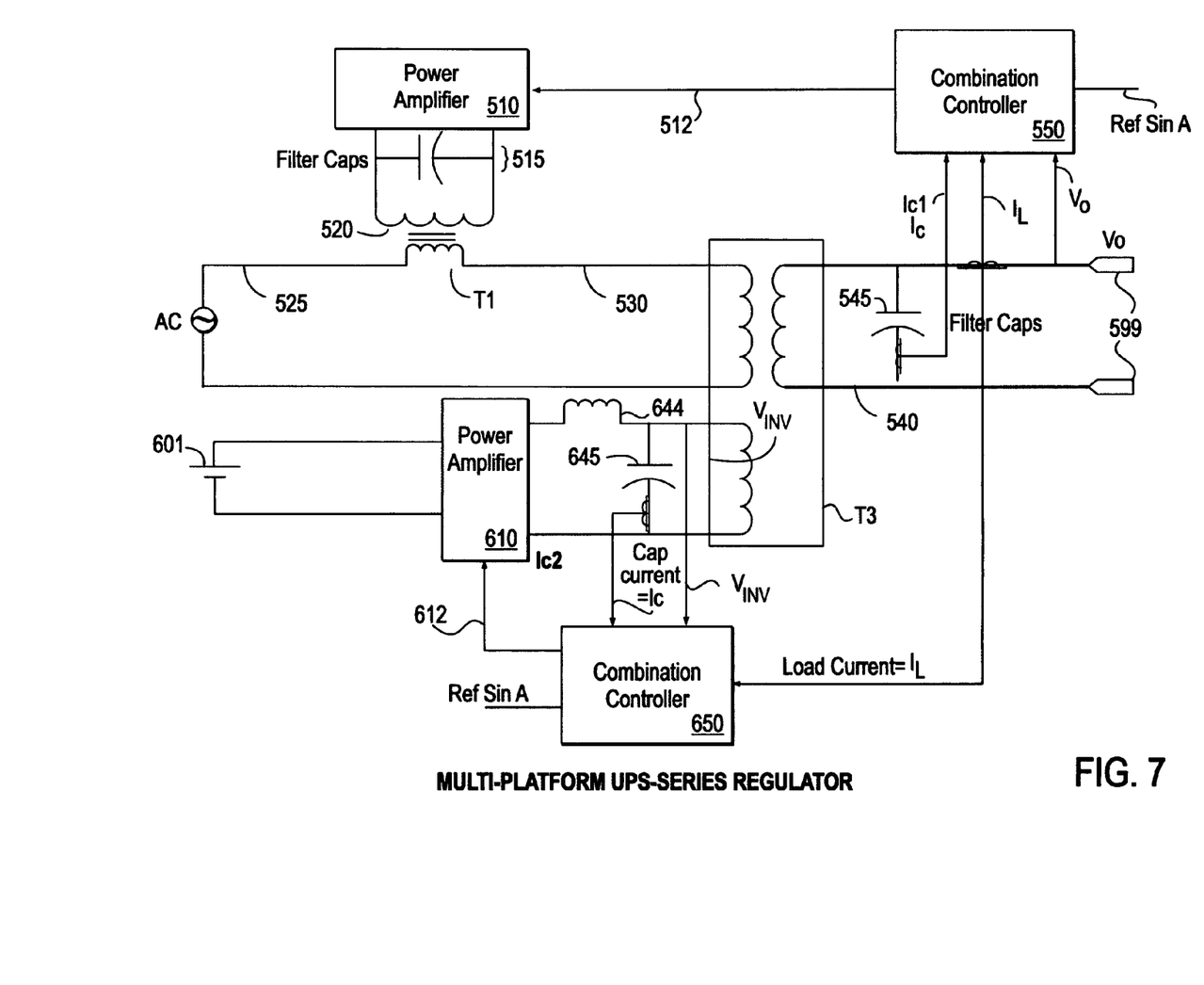
FIG. 7 is a block diagram of an uninterruptible power supply (UPS) using the combination controller of FIG. 3.

The third exemplary application of the controller of the present invention is depicted in the block diagram of the cross platform uninterruptible power supply of FIG. 7. It can be appreciated that the UPS incorporates the power conditioner of FIG. 6 in combination with an inverter circuit coupled to a DC power supply to form the UPS. With the components of the power conditioner previously described above, further description of FIG. 7 begins with the inverter circuit. The output transformer T2 has been replaced with a three winding transformer T3 that couples both the conditioned or regulated voltage signal 530 and the output from the inverter circuit $V_{INV}$ to the pre-filtered output voltage signal 540. A battery supply 601 or alternative suitable reserve DC voltage is coupled to a power amplifier 610 driven by a combination controller 650 of the construction and operation described with respect to FIG. 3. The controller 650 receives the load current $I_L$ and a current across capacitor 645, and further receives a reference sinusoidal signal. An inverter voltage $V_{INV}$ also known as a shunt voltage is used to drive the transformer T3 when the input voltage signal falters is fed back to the combination controller 650 in a feedback loop to regulate the voltage through the three winding transformer T3. A sinusoidal control signal 612 with steady state and transient error correction processed through a constant frequency pulse width modulator to the power amplifier 610, and filtered using the inductor 644 and capacitor 645 prior to communicating the signal to the transformer T3. The DC power supply 601 kicks in when the AC power supply is interrupted or there is a discontinuity/instability in the power supply, and the inverter circuit takes over to provide a steady power flow to the output terminals 599. One of ordinary skill in the art will appreciate that the foregoing can readily be implemented for a three phase system (or any other polyphase system) using the above described elements for each phase.

Figure 8:
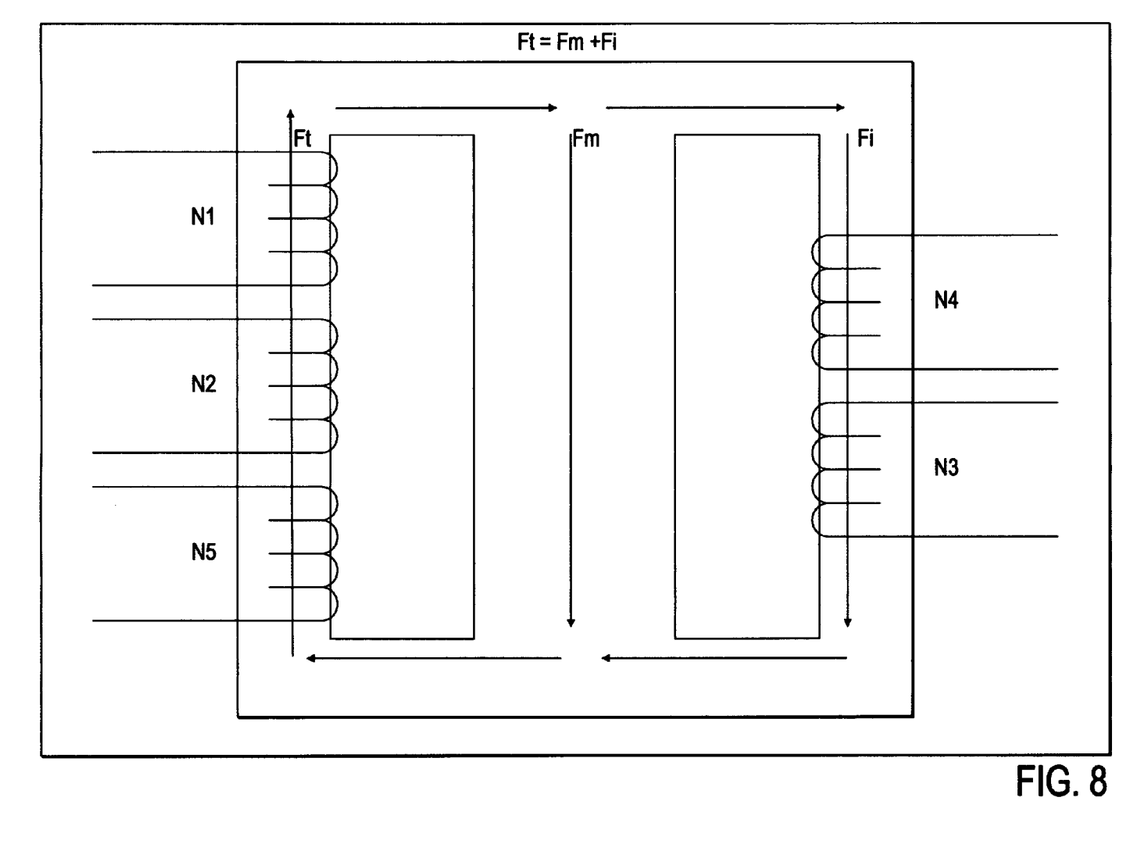
FIG. 8 is an alternate transformer arrangement of the UPS of FIG. 6 using a single, three core transformer.

FIG. 8 illustrates an alternative transformer arrangement for a uninterruptible power supply using the combination controller of FIG. 7. In FIG. 8, a single three core transformer arrangement replaces the two transformer arrangement of FIG. 7 for use with the UPS, where the series regulation (previously accomplished with the series transformer) is now accomplished by changing the flux in the outer 820,830 and the middle core 810 of the three core transformer 800. The change in flux in the outer winding and middle winding allows the output voltage Vo across the winding N5 to be varied, where the output voltage is the sum of the voltage across windings N4 and N5. The winding N4 is connected in series with the input voltage Vi or winding N5 to regulate the output voltage. Here, the utility power Vi is coupled to the single transformer 800 at winding N1. Using the combination controller of FIG. 3 to adjust the voltage of first inverter, the fine regulation of the output voltage, including harmonics regulation, is maintained. The second inverter is coupled to input winding N3 for course regulation of the output voltage Vo. The fine regulation of the output voltage is accomplished with the first inverter at N2 using the combination controller of FIG. 3. This embodiment is less limited in the size of the series transformer in relation to the output regulation limits.

Various changes and modifications may be made in the construction and mode of operation of the control system and devices utilizing said control system described above. These changes, which are in accordance with the spirit of the invention, come within the scope of the appended claims and are embraced thereby.

We claim:

1. A combination controller for a feedback system comprising:
    a first controller for regulating a steady state value of an amplified output voltage signal of said combination controller, said first controller receiving first and second voltage inputs, said first voltage input comprising a reference DC voltage ($V_{ref}$) and said second voltage input comprising said amplified output voltage signal of said combination controller ($V_O$), and said first controller generating a steady state error correction signal ($E_{SS}$) therefrom;
    a second controller cooperating with said first controller and configured to receive said steady state error correction signal ($E_{SS}$), a reference sinusoidal voltage ($V_{ref\ Sin\ A}$), said amplified output voltage signal of said combination controller ($V_O$), a current signal corresponding to a pre-load filter capacitor ($I_C$), and an output current signal ($I_L$), and said second controller generating a transient response error signal ($E_T$) therefrom; and
    a third controller cooperating with said second controller and configured to receive said transient response error signal ($E_T$), said third controller generating a constant frequency pulse width modulated (PWM) sinusoidal voltage signal.

2. The combination controller of claim 1 wherein said first controller performs proportional-plus-integral (PI) control to regulate the STEADY STATE value.

3. The combination controller of claim 2 wherein said first controller further performs proportional-plus-integral-plus-derivative (PID) control to regulate the steady state value.

4. The combination controller of claim 1 wherein the second controller solves state equations for $dV_O/dt$ and $dI_C/dt$ using a sensed output voltage and a sensed filter capacitor current.

5. The combination controller of claim 1 wherein said first controller is constructed to produce said steady state error with a value of less than one percent.

6. The combination controller of claim 5 constructed to produce a total harmonic distortion (THD) with a value of less than one percent.

7. The combination controller of claim 1, wherein the amplified output voltage signal ($V_O$) of said combination controller is constructed so as to produce no phase shift in comparison with a phase of a load coupled thereto.

8. A frequency converter for converting an input AC voltage to AC voltage at a specified frequency comprising:
   a rectifier for converting said input AC voltage at a first frequency to a DC voltage;
   a combination controller configured to receive said DC voltage from said rectifier comprising:
      a first controller for regulating a steady state value of an amplified output voltage signal of said combination controller, said first controller receiving first and second voltage inputs, said first input comprising said DC voltage from the rectifier and said second input comprising said amplified output voltage signal ($V_O$), and generating a steady state error correction signal ($E_{SS}$);
      a second controller cooperating with said first controller and configured to receive said steady state error correction signal ($E_{SS}$), a reference sinusoidal voltage ($V_{ref\,Sin\,A}$), said amplified output voltage signal ($V_O$), a current signal corresponding to a pre-load filter capacitor ($I_C$), and an output current signal ($I_L$), and generating a transient response error signal ($E_T$); and
      a third controller cooperating with said second controller and configured to receive said transient response error signal ($E_T$) and generate a constant frequency pulse width modulated (PWM) sinusoidal voltage signal at a second frequency;
   a power amplifier configured to receive said PWM sinusoidal voltage signal and said DC voltage from the rectifier, and generate the amplified output voltage signal ($V_O$) at said second frequency; and
   a voltage filter between said power amplifier and a load, said voltage filter including a capacitor coupled to said second controller of said combination controller for supplying said current signal ($I_C$) corresponding to a current across said filter capacitor to said second controller.

9. The frequency converter of claim 8 wherein said first controller performs proportional-plus-integral (PI) control to regulate the STEADY STATE value.

10. The frequency converter of claim 9 wherein said first controller further performs proportional-plus-integral-plus-derivative (PID) control to regulate the STEADY STATE value.

11. The frequency converter of claim 8 wherein the second controller is constructed to solve a set of state equations for $dV_O/dt$ and $dI_C/dt$ using a sensed output voltage and a sensed filter capacitor current.

12. The frequency converter of claim 8 having a first controller constructed to produce a value of steady state error of less than one percent.

13. The frequency converter of claim 12 wherein the controller is constructed to produce a value of total harmonic distortion (THD) of less than one percent.

14. The frequency converter of claim 8, wherein the amplified output voltage signal ($V_O$) of said combination controller is constructed to produce no phase shift in comparison with a phase of a load coupled thereto.

15. A power conditioner comprising:
   a combination controller comprising:
      a first controller for regulating a steady state value of an amplified output voltage signal of said combination controller, said first controller receiving first and second voltage inputs, said first voltage input comprising a reference DC voltage ($V_{ref}$) and said second voltage input comprising said amplified output voltage signal of said combination controller ($V_O$), and said first controller generating a steady state error correction signal ($E_{SS}$) therefrom;
      a second controller cooperating with said first controller and configured to receive said steady state error correction signal ($E_{SS}$), a reference sinusoidal voltage ($V_{ref\,Sin\,A}$), said amplified output voltage signal of said combination controller ($V_O$), a current signal corresponding to a pre-load filter capacitor ($I_C$), and an output current signal ($I_L$), and said second controller generating a transient response error signal ($E_T$) therefrom; and
      a third controller cooperating with said second controller and configured to receive said transient response error signal ($E_T$), said third controller generating a constant frequency pulse width modulated (PWM) sinusoidal voltage signal;
   a power amplifier configured to receive said constant frequency pulse width modulated (PWM) sinusoidal voltage signal and generate an amplified power signal;
   a series boost transformer coupled to said power amplifier and configured to receive said amplified power signal, and coupled to an AC input voltage source, said series transformer adapted to condition an input voltage from said AC input voltage source using said amplified power signal to generate a first transformed voltage signal ($V_{T1}$);
   an output transformer coupled to said series transformer and adapted to convert said first transformed voltage signal ($V_{T1}$) to the amplified output voltage signal ($V_O$); and
   a voltage filter between said power output transformer and a load, said voltage filter including a capacitor coupled to said second controller of said combination controller for supplying said current signal ($I_C$) corresponding to a current across said filter capacitor to said second controller.

16. An uninterrupted power supply supporting an AC input power source comprising:
   a first combination controller comprising:
      a first controller for regulating a steady state value of an amplified output voltage signal ($V_O$), said first controller receiving first and second voltage inputs, said first input comprising a reference DC voltage and said second input comprising said amplified output voltage signal ($V_O$), and generating a steady state error correction signal ($E_{SS}$);
      a second controller cooperating with said first controller and configured to receive said steady state error correction signal ($E_{SS}$), a reference sinusoidal voltage ($V_{ref\,Sin\,A}$), said amplified output voltage signal ($V_O$), a current signal corresponding to a pre-load filter capacitor ($I_C$), and an output current signal ($I_L$), and generating a transient response error signal ($E_T$); and
      a third controller cooperating with said second controller and configured to receive said transient response error signal ($E_T$) and generate a constant frequency pulse width modulated (PWM) sinusoidal voltage signal;

a power amplifier configured to receive said constant frequency PWM sinusoidal voltage signal and generate an amplified power signal;

a series boost transformer coupled to said power amplifier and configured to receive said amplified power signal, and further coupled to an input AC voltage source, said series boost transformer adapted to convert said amplified power signal to a first transformed voltage signal ($V_{T1}$);

a three winding output transformer comprising an input winding coupled to said series transformer, an output winding adapted to convert said first transformed voltage signal ($V_{T1}$) to the amplified output voltage signal ($V_O$), and an inverter winding coupled to an inverter for receiving an inverter AC voltage to convert said inverter AC voltage to the amplified output voltage signal ($V_O$);

a voltage filter between said three winding output transformer and a load, said voltage filter including a capacitor coupled to said second controller of said first combination controller for supplying said current signal ($I_C$) corresponding to a current across said filter capacitor to said second controller;

a DC power source; and an inverter for converting a DC voltage from said DC power source to an inverter AC voltage, said inverter AC voltage coupled to said three winding transformer to feed AC power to said three winding transformer when said input AC power source is interrupted.

17. The uninterrupted power supply of claim 16 wherein said inverter further comprises a second combination controller comprising:

a proportional-integral controller for regulating a steady state value of the inverter voltage and configured to receive as a first input a reference DC voltage ($V_{ref}$) and a second input comprising said inverter AC voltage, and generating a steady state error correction signal ($E_{SS}$);

a state space controller for regulating a transient response of said inverter, cooperating with said proportional-integral controller and configured to receive said steady state error correction signal, a reference sinusoidal voltage, said inverter AC voltage, a current signal corresponding to a pre-transformer filter capacitor, and an output current signal ($I_L$), and generating a transient response error signal;

a PWM controller cooperating with said state space controller and configured to receive said transient response error signal and generate a constant frequency pulse width modulated (PWM) sinusoidal voltage signal; and an inverter power amplifier configured to receive said PWM sinusoidal voltage signal from said PWM controller and generate the inverter AC voltage supplied to said three winding output transformer.

18. The uninterrupted power supply of claim 17 wherein said proportional-integral controller further performs proportional-plus-integral-plus-derivative (PID) control.

19. The uninterrupted power supply of claim 17 having said steady state error of less than one percent.

20. The uninterrupted power supply of claim 19 having a total harmonic distortion (THD) of less than one percent.

21. The uninterrupted power supply of claim 17 wherein the amplified output voltage signal ($V_O$) of said combination controller has no phase shift in comparison with a phase of a load coupled thereto.

22. An uninterrupted power supply supporting an AC input power source comprising:

a first combination controller comprising:

a first controller for regulating a steady state value of an amplified output voltage signal ($V_O$), said first controller receiving first and second voltage inputs, said first input comprising a reference DC voltage and said second input comprising said amplified output voltage signal ($V_O$), and generating a steady state error correction signal ($E_{SS}$);

a second controller cooperating with said first controller and configured to receive said steady state error correction signal ($E_{SS}$), a reference sinusoidal voltage ($V_{ref\,Sin\,A}$), said amplified output voltage signal ($V_O$), a current signal corresponding to a pre-load filter capacitor ($I_C$), and an output current signal ($I_L$), and generating a transient response error signal ($E_T$); and a third controller cooperating with said second controller and configured to receive said transient response error signal ($E_T$) and generate a constant frequency pulse width modulated (PWM) sinusoidal voltage signal;

a power amplifier configured to receive said constant frequency PWM sinusoidal voltage signal and generate an amplified power signal;

a first inverter for converting a DC voltage from a DC power source to a first inverter AC voltage, said first inverter AC voltage coupled to a three core transformer using said combination controller for fine regulation of said output voltage;

a second inverter for converting a DC voltage from a DC power source to a second inverter AC voltage, said second inverter AC voltage coupled to the three core transformer for course regulation of said output voltage;

a three core transformer comprising an input winding coupled to input power source, an output winding for producing an output voltage signal ($V_O$), a first inverter winding coupled to said first inverter for receiving the first inverter AC voltage, a second inverter winding coupled to said second inverter for receiving the second inverter AC voltage, and a control winding connected in series with one of said output voltage winding and said input winding and said output winding;

a voltage filter between said three core transformer and a load, said voltage filter including a capacitor coupled to said first combination for supplying said current signal ($I_C$) corresponding to a current across said filter capacitor to said first combination controller.

23. A combination controller for a feedback system comprising:

a first control means for regulating a steady state value of an amplified output voltage signal of said combination controller, said first control means receiving first and second voltage inputs, said first voltage input comprising a reference DC voltage ($V_{ref}$) and said second voltage input comprising said amplified output voltage signal of said combination controller ($V_O$), and said first control means generating a steady state error correction signal ($E_{SS}$) therefrom;

a second control means cooperating with said first control means and configured to receive said steady state error correction signal ($E_{SS}$), a reference sinusoidal voltage ($V_{ref\ Sin\ A}$), said amplified output voltage signal of said combination controller ($V_O$), a current signal corresponding to a pre-load filter capacitor ($I_C$), and an output current signal ($I_L$), and said second control means generating a transient response error signal ($E_T$) therefrom; and a third control means cooperating with said second control means and configured to receive said transient response error signal ($E_T$), said third control means generating a constant frequency pulse width modulated (PWM) sinusoidal voltage signal.

* * * * *